United States Patent
Watanabe et al.

(10) Patent No.: US 7,858,179 B2
(45) Date of Patent: Dec. 28, 2010

(54) MANUFACTURING METHOD OF LAMINATED METAL PLATE AND LAMINATED METAL PLATE MANUFACTURED BY THE METHOD

(75) Inventors: Toshio Watanabe, Osaka (JP); Isamu Matsuura, Osaka (JP)

(73) Assignee: Laminate Industry Co., Ltd., Osaka (JP)

( * ) Notice: Subject to any disclaimer, the term of this patent is extended or adjusted under 35 U.S.C. 154(b) by 0 days.

(21) Appl. No.: 12/718,564

(22) Filed: Mar. 5, 2010

(65) Prior Publication Data
US 2010/0159237 A1    Jun. 24, 2010

Related U.S. Application Data

(62) Division of application No. 11/527,606, filed on Sep. 27, 2006, now Pat. No. 7,708,850.

(30) Foreign Application Priority Data

May 25, 2006    (JP)    .............................. 2006-171907

(51) Int. Cl.
*B32B 37/00*    (2006.01)
(52) U.S. Cl. ........................ 428/339; 156/82; 156/497; 428/332
(58) Field of Classification Search .................. 156/82, 156/308.2, 309.6, 322, 324, 497, 499; 428/332, 428/339
See application file for complete search history.

(56) References Cited

U.S. PATENT DOCUMENTS 7,364,799 B2 *    4/2008    Kurita et al. .............. 428/477.7
7,468,197 B2 *    12/2008    Kurita et al. ................ 427/177

* cited by examiner

*Primary Examiner*—James Sells
(74) *Attorney, Agent, or Firm*—Ronald E. Greigg

(57) ABSTRACT

In the manufacturing method of the laminated metal plate, a fluorine resin film is used as a plastic film. Prior to a flame treatment, a joint surface of the metal plate is heated with a direct flame of 900° C. to 1200° C. for 1 to 5 seconds so that the joint surface is preheated to 40° C. to 70° C. After that, the joint surface of the metal plate is heated to 250° C. to 450° C. by the follow-on flame treatment.

2 Claims, 1 Drawing Sheet

MANUFACTURING METHOD OF LAMINATED METAL PLATE AND LAMINATED METAL PLATE MANUFACTURED BY THE METHOD

CROSS REFERENCE TO RELATED APPLICATIONS

This application is a divisional application of Ser. No. 11/527,606 filed on Sep. 27, 2006, U.S. Pat. No. 7,708,850, based on Japanese Patent Application No. 2006-171907 filed on May 25, 2006, upon which priority is claimed. These applications are hereby incorporated by reference in their entireties.

BACKGROUND OF THE INVENTION

1. Field of the Invention

This invention relates to a manufacturing method of a laminated metal plate in which a plastic film (sheet) is laminated on a surface of a metal plate, and to an improved laminated metal plate manufactured by the method.

2. Description of the Prior Art

As a metal container (made of a steel plate, for example) for containing kerosene, animal and vegetable oils, solvents, chemicals, adhesive agents, etc., a zinc-lined or tin-lined container is used. However, such a lining is not enough in many cases depending on a contained substance. Therefore, lining by a baked coating material like epoxy resin, or lining using an adhesive agent of polyethylene, polypropylene, polyester film, etc. is performed, in addition to the afore-mentioned lining.

Bonding of the lining material to the metal plate is usually carried out by a thermo-fusion method in addition to the method using the above-mentioned adhesive agents. In the thermal adhesion method, the metal plate and a synthetic resin film are heated by making them go through a heating furnace, by Joule heat by eddy current induced in the metal plate (magnetic material: a steel plate or the like), by an electromagnetic induction coil, or by flame treatment as suggested by the inventor of this invention in Japanese Patent Publication No. 7-100,350 (No. 7-100,350).

According to the flame treatment method, the metal plate and the synthetic resin film are continuously joined together while treating each of the surfaces by flame immediately before joining. According to this method, sufficient joint strength can be obtained without pretreatment on the metal plate or the synthetic resin film for improvement of adhesion performance, a harmful substance like an adhesive agent is eliminated, and use of a large-scale heating furnace or an electromagnetic induction device is eliminated, wherefore there is an advantage that the economical impact is extremely large.

When a steel plate is coated or lined with resin, a predetermined pretreatment (cleaning of the metal plate surface or the synthetic resin film: sanding, degreasing, washing, drying, anchor coating, etc.) for improving the adhesion performance has to be carried out upon adhesion. In the film lining like polyethylene, the steel-side needs the pretreatment and a primer coat, and the film-side needs a corona treatment, a use of a double-layer structure film in which an adhesive resin is laid, or coating of the primer on the film. On the other hand, according to this flame treatment method, these processes are eliminated.

In the meantime, as the synthetic resin film, an inert fluorine resin film is suitable for use as a lining material in addition to the above-mentioned polyethylene film, polypropylene film and polyester film that have been conventionally used as lining materials. The fluorine resin film has excellent properties in corrosion resistance, contamination resistance, adhesion resistance, chemical resistance, heat resistance, incombustibility, etc. Therefore, the fluorine resin film is one of the best lining materials for lining a metal container for containing kerosene, animal and vegetable oils, various solvents, chemicals, adhesive agents, etc. In particular, the fluorine resin film as a lining material is more effective when used in cooking equipments and food processing equipments, cooking heaters like an inner plate of a microwave oven, an inner pan of a rice cooker or a top panel of a gas cooking stove, kitchen material like a material for a range hood, medical apparatuses, outdoor construction materials like an external facing panel of a road, a roof and exterior wall panel of a building, etc.

The fluorine resin film has the problems that the surface tension is small and securing of adhesiveness by thermo-fusion is difficult due to its non-adhesiveness. Thermo-fusion of the fluorine resin film with the metal surface is particularly difficult when one molecular unit contains two or more fluorine atoms, like tetrafluoroethylene-perfluoroalkylvinylether copolymer resin (PFA), tetrafluoroethylene-hexafluoropropylene copolymer (FEP), or tetrafluoroethylene-tetrafluoroethylene copolymer resin (ETFE), in particular.

A method for solving the problems in the thermo-fusion of the fluorine resin film on the metal plate surface is, as suggested in Japanese Patent Laid-Open Publication No. 2000-280,402, that a colored coating film layer comprising a polyvinylidene fluoride resin and acrylic resin, is laid on the metal surface in advance for the thermo-fusion, which is then baked and dried. After that, a transparent fluoroplastic film comprising the polyvinylidene fluoride resin and the acrylic resin, is thermally fused.

However, in the above-mentioned method of thermo-fusion, the metal plate needs pretreatment before the thermo-fusion, and the fluorine resin film needs the primer. As suggested earlier in No. 7-100,350, the inventor studied whether lining by thermally fusing the fluorine resin film is possible by adopting the flame treatment method which is a simple means needing no pretreatment. Based on the method disclosed in No. 7-100,350, various experiments were conducted by using tetrafluoroethylene-perfluoroalkylvinylether copolymer resin (PFA), tetrafluoroethylene-hexafluoropropylene copolymer resin (FEP), or tetrafluoroethylene-tetrafluoroethylene copolymer resin (ETFE), however, excellent adhesiveness was not obtained.

Possible reasons why excellent adhesiveness was obtained in polyethylene, polypropylene, or polyester film without any problems, but not in the fluorine resin film, were studied and analyzed. As a result, it is speculated that the conventional flame treatment on the metal plate is insufficient because the material has a very small surface tension and has a characteristic of non-adhesiveness.

SUMMARY OF THE INVENTION

A purpose of this invention is to provide a manufacturing method of a laminated metal plate laminated with the fluorine resin film being excellent in heat resistance, durability, adhesiveness, etc., and having various excellent properties like corrosion resistance, contamination resistance, film surface contamination resistance (anti-stickiness), wear resistance, workability and rigidity of the material, and also to provide the laminated metal plate manufactured in the method, of which the metal plate does not need a chemical conversion treatment or a primer, and thermo-fusion can be conducted to obtain a sufficient adhesive strength without converting the characteristic of the fluorine resin film.

To achieve the above-mentioned purposes, in the manufacturing method of the laminated metal plate of this invention, a joint surface of the metal plate with a thickness of 0.1 mm to 1.00 mm, without undergoing any pretreatment like degreasing, washing, treatment for chemical conversion, treatment with a primer, is treated with the direct flame of 1400° C. to 1600° C., and a plastic film is directly joined under pressure by using a fluorine resin film as the plastic film, flaming the joint surface of the metal plate with a direct fire of 900° C. to 1200° C. for 1 to 5 seconds prior to the above-mentioned flame treatment, so that the temperature of the joint surface may be preheated to 40° C. to 70° C., and then heating the joint surface of the metal plate by the follow-on flame treatment so that the temperature of the joint surface is heated to 250° C. to 450° C. The joint surface of the metal plate is preheated with the direct flame of 900° C. to 1200° C. for 1 to 5 seconds to raise the surface temperature of the joint surface to 40° C. to 70° C. prior to the flame treatment.

Then the flame treatment is conducted to raise the surface temperature of the joint surface of the metal plate to 250° C. to 450° C.

The laminated metal plate of this invention preferably employs a resin film composed of tetrafluoroethylene-tetrafluoroethylene-based copolymer.

According to the manufacturing method of the laminated metal plate of this invention, even the fluorine resin film having very small surface tension and anti-stickiness can adhere to the metal plate with close adhesiveness and sufficient joint strength by introducing a process of preheating the metal plate at a low temperature to raise the surface temperature to 40° C. to 70° C. prior to a conventional heating treatment at a high temperature. It is speculated that the adhesiveness is remarkably improved because distortion of the metal plate and its surface is prevented by introducing the process of preheating at the low temperature while the metal plate is conventionally heated to a high temperature at a burst.

As a result, the laminated metal plate laminated with the fluorine resin film can be manufactured without a need for the chemical conversion treatment or the primer on the metal plate or for the property modification of the fluorine resin film, of which the fluorine resin film has an excellency in the adhesiveness to the metal plate, carries out the thermo-fusion with an excellent adhesive strength, excels in heat resistance, durability, and close adhesiveness, and has various excellent characteristics like corrosion resistance, contamination resistance, surface adhesion resistance, wear resistance, workability and material rigidity. Further, since an expensive adhesive agent (an adhesive agent layer) is not used, the product can be offered inexpensively and the product is not harmful to the environment when discarded.

The laminated metal plate according to this invention is manufactured by the above-mentioned manufacturing method and is excellent in the adhesion strength between the fluorine resin film and the metal plate. Therefore, by working on this, the laminated metal plate can be used for cooking equipments and food processing equipments, cooking heaters like an inner plate of a microwave oven, an inner pan of a rice cooker or a top panel of a gas cooking stove, kitchen material like a material for a range hood, medical apparatuses, outdoor construction materials like an external facing panel of a road, a roof and exterior wall panel of a building, etc., as well as for various kinds of containers.

BRIEF DESCRIPTION OF THE DRAWINGS

The foregoing features and advantages of the invention will become apparent from the description contained herein below, taken in conjunction with the drawings, in which.

DETAILED DESCRIPTION OF THE PREFERRED EMBODIMENTS

In the illustrated embodiment of the invention, the fluorine resin film preferably comprises ethylene-tetrafluoroethylene-based copolymer. An advantage in using this fluorine resin film is that it is inexpensive and easily available in general.

Alternatively, tetrafluoroethylene-perfluoroalkylvinylether copolymer resin (PFA) or tetrafluoroethylene-hexafluoropropylene copolymer resin (FEP), which is similar to the above-mentioned, may also be used.

Further, by changing the temperature and the time of the flame treatment of the invention, not to mention polyethylene, polyethylene terephthalate and polypropylene, other non-adhesive films may also be applicable.

As the metal plate comprising the laminated metal plate laminated with the fluorine resin film, various metal plates like a cold-rolled steel plate, a stainless steel plate, an aluminum plate, a copper plate or a titanium alloy plate, etc., and various plated metal plates like a galvanized steel plate, a zinc-aluminum alloy plated steel plate, an aluminum plating steel plate or the like, having a thickness of from about 0.1 mm to about 1.00 mm, may be used. These metal plates may be in either the form of a sheet cut to a length, or of a coil.

The above-mentioned fluorine resin film may either be a single-layered body or a multi-layered body. The fluorine resin film may be transparent, printed or colored.

In a first embodiment, the manufacturing method of the laminated metal plate of this invention is described in detail hereinafter referring to FIGS. 1 and 2.

Figure 1:
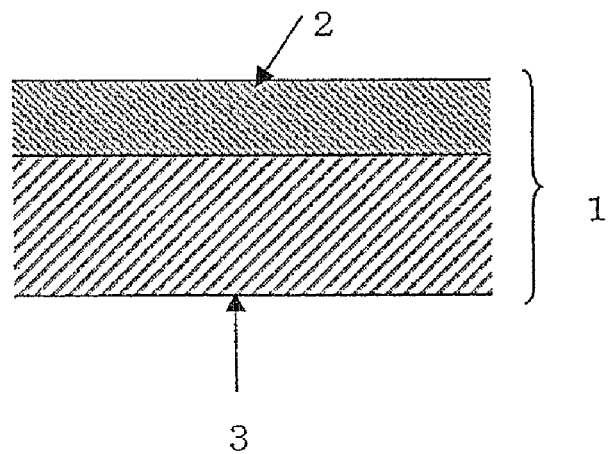
FIG. 1 is a pattern diagram of a vertically sectional side view of the laminated metal plate of this invention.
Figure 2:
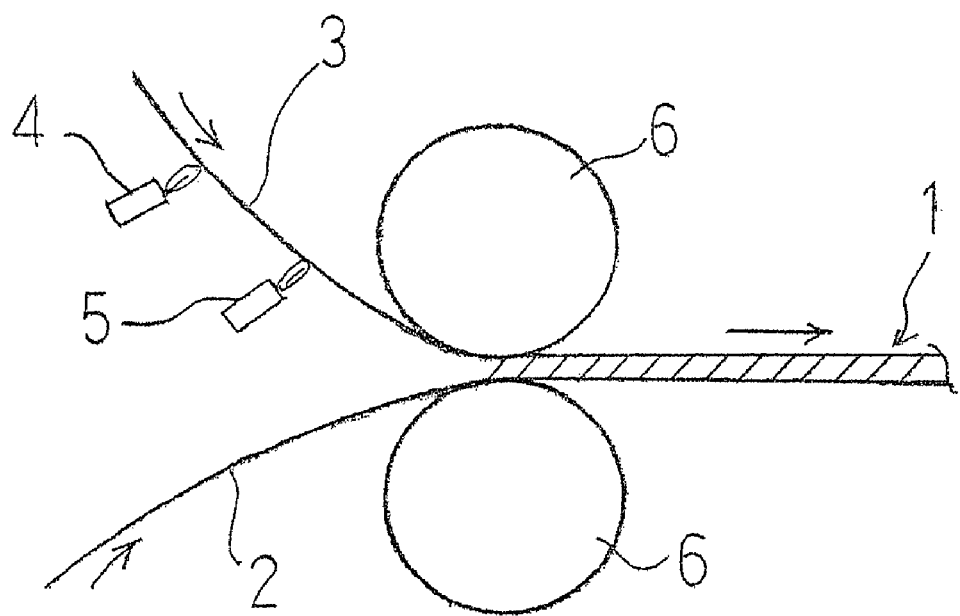
FIG. 2 is a simplified overview of the process showing the manufacturing method of the laminated metal plate of this invention.

According to the process as shown in FIG. 2, a direct fire (flame) of 900° C. to 1200° C. is applied to a TFS steel plate (709 mm×917 mm) having a thickness of 0.3 mm, as the metal plate 3, for 4 seconds by a first flame nozzle 4 as a preheating process to preheat the surface of the metal plate 3 to about 60° C. Immediately after (after about 1 second) the preheating of the metal plate 3, a direct flame of 1400° C. to 1600° C. is applied to the metal plate 3 by a second flame nozzle 5 for 4 seconds to heat the surface of the metal plate 3 to 300° C. As the fluorine resin film 2, an ETFE (manufactured by Asahi Glass Co., Ltd.: Fluon ETFE: ethylene-tetrafluoroethylene-based copolymer) having a thickness of 50 μm undergoes thermal compression bonding by a pair of opposed pinch rolls 6 to make the laminated metal plate 1 laminated with the fluorine resin film, as shown in FIG. 1. The transfer speed of the metal plate 3 and the fluorine resin film 2 in this thermal compression bonding process is 15 m/min.

FIG. 1 is a pattern diagram showing the state of lamination of the fluorine resin film 2 and the metal plate 2, whose sizes are not interfaced with each other.

The ETFE has a thickness of 50 μm. The first flame nozzle 4 preheats the metal plate for a period of between 1 and 5 seconds, and no problem is found in the result. The surface temperature of the metal plate is in the range between 40 and 70° C., respectively, and no problem is also found in the result. Further, heating by the second flame nozzle 5 is carried out within a range of the period between 2 and 5 seconds, and no problem is found in the result. The heated temperature of the metal surface at this time is in the range between 250° C. and 450° C., and no problem is found in the result.

In a second embodiment, not shown in the drawings, a direct fire of 900° C. to 1200° C. is applied to a TFS steel plate (709 mm×917 mm) with a thickness of 0.3 mm, as the metal plate, for 3 seconds as the preheating process to heat the surface of the metal plate to 50° C. Immediately after (about 1 second later) the metal plate is preheated by a flame of 1400° C. to 1600° C. applied for 3 seconds to heat the surface of the metal plate to 300° C. As the fluorine resin film, an ETFE (Asahi Glass Co., Ltd. Fluon ETFE: ethylene-tetrafluoroethylene-based copolymer) having a thickness of 25 μm undergoes thermal compression bonding to make the laminated metal plate laminated with the fluorine resin. The transfer speed of the metal plate 3 and the fluorine resin film 2 in this thermal compression bonding process is 15 m/min.

The ETFE has a thickness of 25 μm. The first flame nozzle 4 preheats the metal plate for a period of between 1 and 5 seconds, and no problem is found in the result. The surface temperature of the metal plate is in the range between 40° C. and 70° C. respectively, and no problem is found in the result. Further, heating the metal surface by the second flame nozzle 5 is carried out within a time ranging between 2 and 5 seconds, and no problem is found in the result. The heating temperature of the surface at this time is in the range between 250° C. and 450° C., and no problem is found in the result.

Various performance tests described hereinafter were conducted on the laminated metal plates laminated with the fluorine resin films of the embodiment 1 and the embodiment 2, which were made as described above. Both of the laminated metal plates laminated with the fluorine resin films of this invention, as described in the Embodiment 1 and the Embodiment 2, have excellent adhesiveness and also excel in corrosion resistance, contamination resistance, heat resistance, anti-adhesiveness, workability, etc.

Adhesiveness:

According to a method of JISK5400 for testing a coating material in general, the fluorine-resin-film sides of the test specimens (the laminated metal plates of Embodiment 1 and Embodiment 2) were cut in a grid (10×10 at intervals of 1 mm) to the depth reaching the metal plate, and the laminated metal plates underwent Erichsen protrusion of 8 mm and were soaked in a boiled water for 3 hours. Then, the adhesiveness was evaluated by a tape release test. The evaluation was expressed by using a symbol ⊚, when there was no release at all, a symbol ○, when there were 1 to 5 released parts, a symbol Δ, when there were 6 to 10 released parts, and a symbol X, when there were 11 or more released parts.

Corrosion Resistance:

The test specimens (the laminated metal plates of the Embodiment 1 and the Embodiment 2) were bent at a right angle with their fluorine resin film faces outside. In the state of being bent, the test specimens underwent a salt spray test under conditions of a salt solution of 5%, the temperature of 35° C. for 1.000 hours based on the JIS Z2371, and a status of rust generation was checked and evaluated after the test. The evaluation was expressed by using a symbol ⊚, when there was no defect at all, a symbol ○, when the rust generation was found at a part of the bent part, a symbol Δ, when the rust generation was found at the entire area of the bent part, and a symbol X, when the rust generation was found on a flat plate part.

Workability:

The test specimens (the laminated metal plates of the Embodiment 1 and the Embodiment 2) were repeatedly bent at a right angle with their fluorine resin film faces outside until the test specimens come apart, and a crack and exfoliation of the film was checked. The evaluation was expressed by using a symbol ⊚, when there is no defect at all, and a symbol X, when a crack or exfoliation is found.

Heat Resistance:

The test specimens (the laminated metal plates of the Embodiment 1 and the Embodiment 2) were heated in the air of 200° C. for 15 minutes, and this process was repeated 20 times. Then the state of exfoliation, contraction, change in color, etc. of the fluorine resin film was checked and evaluated. The evaluation was expressed by using a symbol ⊚, when there is no defect at all, and a symbol X, when any of the defects were found. The results are shown in Table 1, below.

Contamination Resistance and Non Stickiness:

Hair tonic, hair dressing liquid, black marker ink, coffee, black tea, mayonnaise, ketchup, soy sauce, Worcester sauce, Wasabi (Japanese horseradish), and mustard were brought into contact with the fluorine resin film face of the test specimens (the laminated metal plates of the Embodiment 1 and the Embodiment 2) for one week at a room temperature. Then, the test specimens were wiped with cotton wet with ethanol and the state of adhesion was examined and evaluated. The evaluation was expressed by using a symbol ⊚, when each of the substances which was in contact with the test specimens was completely removed with a stroke of wiping and the test specimens were not contaminated at all, a symbol ○, when the test specimens were not contaminated but needs twice or more strokes of wiping, and a symbol X, when the test specimens were contaminated.

Results of the above-mentioned various performance tests were compiled in Table 1 as shown below. Not all of the above-mentioned conditions were detected and the indication marks therefore do not appear in the Table 1.

TABLE 1

|  | Embodiment-1 | Embodiment-2 |
| --- | --- | --- |
| Adhesiveness: | ⊚ | ⊚ |
| Corrosion Resistance: | ⊚ | ○ |
| Workability: | ⊚ | ⊚ |
| Heat Resistance: | ⊚ | ⊚ |
| Contamination Resistance: | ⊚ | ⊚ |
| Non stickiness: | ⊚ | ⊚ |

VERSATILITY IN INDUSTRIAL FIELD

Since the laminated metal plate manufactured by the manufacturing method according to this invention has a sufficient bonding strength due to its excellent adhesiveness, the laminated metal plate can be used for a lining of a container, cooking equipments and food processing equipments, cooking heaters like an inner plate of a microwave oven, an inner pan of a rice cooker or a top panel of a gas cooking stove, kitchen material like a material for a range hood, medical apparatuses, outdoor construction materials like an external facing panel of a road, a roof and exterior wall panel of a building, etc. Thus, the laminated metal plate is versatile.

The foregoing relates to preferred exemplary embodiments of the invention, it being understood that other variants and embodiments thereof are possible within the spirit and scope of the invention, the latter being defined by the appended claims.

We claim:

1. A laminated metal plate in which a laminated metal plate in which a joint surface of a metal plate with a thickness of 0.1 mm to 1.00 mm and without a pretreatment like degreasing, washing, a chemical conversion treatment or a primer treatment, is flamed with a direct fire of 1400° C. to 1600° C. to directly join a plastic film under pressure, wherein said plate is made by a method comprising the steps of:

using a fluorine resin film as the plastic film, flaming the joint surface of the metal plate with a direct fire of 900° C. to 1200° C. for 1 to 5 seconds prior to the above-mentioned flame treatment, so that the temperature of the joint surface may be preheated to 40° C. to 70° C., and then heating the joint surface of the metal plate by the follow-on flame treatment so that the temperature of the joint surface is heated to 250° C. to 450° C.

2. The laminated metal plate as claimed in claim 1, wherein the fluorine resin film is composed of ethylene-tetrafluoroethylene-based copolymer.

* * * * *